Patented Mar. 10, 1936

2,033,133

UNITED STATES PATENT OFFICE 2,033,133

VARNISH BASIS AND PROCESS OF MAKING SAME

Carleton Ellis, Montclair, N. J., assignor to Ellis-Foster Company, a corporation of New Jersey No Drawing. Application February 9, 1934, Serial No. 710,561

9 Claims. (Cl. 260—8)

This invention relates to products resulting from the interaction of cashew liquid with alpha-beta unsaturated polybasic acids or polybasic acids which during reaction decompose to give alpha-beta unsaturated acids.

For comparative purposes to illustrate the type of reaction products obtained with cashew liquid, the following reference to rosin maleic reaction products is given.

The rosin-maleic acid as obtained by hydrolysis of rosin maleic glyceride is formed by the so-called diene reaction. Rosin contains two conjugated double bonds and maleic acid reacts therewith through 1-4 addition, forming a tribasic acid. Therefore hydrolysis of a resin produced by simultaneous reaction of rosin or a rosin derivative and maleic acid or other acid or anyhdride reacting in the same way as maleic, does not yield rosin but an organic acid-compound of rosin. The polybasic acid-compound of rosin has a high softening point and the formation or presence of such a compound in a resin results in a high softening point for the resin.

In the above examples rosin-maleic acid has been obtained by hydrolysis of a resin formed by simultaneous reaction of rosin, maleic acid and glycerol. However, rosin-maleic or -fumaric acid also may be obtained merely by heating rosin with the acid.

The high acid number of rosin-fumaric or -maleic acid may be reduced by esterification with glycerol. In place of glycerol there may be used glycols, polyglycols, polyglycerols, pentaery-thritol, sorbitol or alkalene oxides.

*Example 1.*—100 parts rosin and 26 parts maleic acid were heated gradually to 250° C. The rosin-maleic compound thus formed had a softening point of 125° C. and acid number 298. 20 per cent of glycerol was added and the mixture was heated at 260° C. for 40 minutes and then the temperature was taken to 290° C. The glyceride had a softening point of 129° C. and acid number of 53. It was soluble in toluol, acetone, ethyl acetate and tung oil; insoluble in alcohol. Prolonged heating caused the resin to gelatinize.

A varnish was made by heating 2 parts of tung oil with 1 part of the resin of Example 1. The mixture of resin and drying oil was heated to 260° C. for 10 minutes. Driers consisting of 2 per cent of litharge and 0.1 per cent of cobalt acetate (based on the total quantity of oil and resin) were then stirred in and the mixture was held at 260° C. for 5 minutes longer, or until the driers had been taken up. When the solution had cooled to about 150° C., 3 parts of mineral spirits were added. The varnish was without any cloudiness such as would result from precipitation of the driers. It dried within 3 hours to a smooth glossy waterproof film. A varnish containing linseed oil was made in the same way, using bodied linseed oil in place of tung oil. This varnish was also clear and dried to a glossy film.

Maleic and fumaric acids not only react with rosin in a free state or in presence of glycerol, but they also react with the rosin-residue of rosin esters, rosin phthalic glyceride, rosin-phthalic glyceride resins containing tung oil or other drying oil, phenol-formaldehyde-rosin esters and other rosin-resins, resulting in a hardened resin which does not yield ordinary rosin on hydrolysis. It is a preferred object of this invention to prepare rosin-resins of increased softening point suitable for varnishes.

While the illustrations given above refer to the diene synthesis carried out with the aid of maleic and fumaric acids or maleic anhydride, it is of course understood that various other $\alpha,\beta$-unsaturated acids are applicable in like manner for producing organic acid-hardened rosin utilizable in making varnish resins. Some other unsaturated acids capable of reacting with rosin by the diene synthesis are cinnamic, crotonic, acrylic, itaconic, aconitic, and the like, or the lower monohydric alcohol esters of these acids. It is also possible to treat ordinary rosin with acids such as malic and citric. Resins made from rosin, glycerol and malic or citric acids are disclosed in my Patent 1,722,566, July 30, 1929. The latter acids become unsaturated on heating and form diene reactants capable of combining with natural resins such as rosin, or with rosin-containing synthetic resins, to form products soluble in drying oils. Such acids are therefore to be regarded as equivalents of maleic for the purposes of this invention.

Other natural resins which may be regarded as equivalents of rosin in their reactivity towards maleic acid and the like are sandarac, manila, thus, and elemi.

The purpose of applying the diene reaction to the production of natural resin-modified polybasic acid-polyhydric alcohols is to get products of greater hardness, greater light-fastness and greater stability towards heat-incorporated driers, which properties are concomitant with resins made according to this invention and with the oil varnishes made therefrom. As pointed out above, the resin may be made by simultaneous reaction of all the ingredients, or it can be made by a two or more stage process: first forming the polybasic acid compound of the rosin and then combining this with glycerol. When all the ingredients, for example rosin, maleic anhydride and glycerol, are reacted simultaneously, maleic anhydride is the center of two competitive reactions: glycerol tends to combine with it by esterification and rosin combines with it by the diene reaction. Since the important properties of the final resin from the standpoint of varnishes are conditioned more by the combination of maleic according to the diene synthesis it is preferable to conduct the resinification with a view to getting the maximum of combination between the natural resin and the diene reactant. That is, maleic or its equivalent is first combined with rosin (either free rosin or the rosin-residue of rosin-containing synthetic resins) and the resulting maleic compound is then esterified with glycerol.

Cashew nut shell liquid is another substance which, like rosin and certain other natural resins, forms a reaction product with maleic anhydride or other $\alpha,\beta$-unsaturated acids or anhydrides or with acids which yield $\alpha,\beta$-unsaturated acids or anhydrides during the reaction. Cashew liquid is a brown, non-drying, oily material and, although containing phenolic groups, is practically insoluble in sodium hydroxide solution. When heated with maleic acid, cashew liquid forms a compound which dissolves in aqueous sodium hydroxide and gives a viscous solution. The compound is also soluble in ammonium hydroxide. The maleic compound can be reacted with glycerol to form a very viscous mass which is miscible with tung oil.

*Example 2.*—100 parts cashew liquid was heated to 160° C. and 30 parts maleic acid was added at such a rate as to avoid undue foaming by the water released from the maleic acid. After all the acid had been introduced the temperature was taken to 210° C. and held for 5 minutes. Higher temperatures cause the appearance of a gritty precipitate. The product was a dark brown liquid soluble in aqueous alkalies. 100 parts of the maleic compound was heated to 290° C. over a period of ¾ hour with 9 parts of glycerol. In this way there was formed a very viscous, brown mass, soluble in benzol, toluol and mineral spirits. It is also soluble in drying oils to form a varnish basis. For example, 2 parts of tung oil and 1 part of the cashew-maleic compound were mixed. At first a turbid mass was obtained but at higher temperatures this became more homogeneous. Heated to 260° C. a clear solution formed which with addition of litharge and cobalt acetate as driers and thinning with mineral spirits formed a varnish which dried to a light brown, tough film.

The proportion of $\alpha,\beta$-unsaturated acid can be varied. High proportions yield more viscous products than when lesser amounts are used.

What I claim is:

1. The reaction product of cashew liquid and an $\alpha,\beta$-unsaturated acid.
2. The reaction product of cashew liquid and maleic acid.
3. A varnish basis comprising the glyceride of the reaction product of cashew liquid and an $\alpha,\beta$-unsaturated acid, and a drying oil.
4. A varnish basis comprising the glyceride of the reaction product of cashew liquid and maleic acid, and a drying oil.
5. A composition containing a polyhydric alcohol ester of the reaction product of cashew liquid and an alpha-beta unsaturated acid.
6. A composition containing a glyceride of the reaction product of cashew liquid and maleic acid.
7. The method which comprises heating cashew liquid with an alpha-beta unsaturated acid to produce a reaction product thereof.
8. The method which comprises heating cashew liquid with an alpha-beta unsaturated acid to produce a reaction product thereof, incorporating a drying oil, and heating to produce a homogeneous product.
9. The method which comprises heating 100 parts cashew liquid with about 30 parts maleic acid to produce a liquid reaction product soluble in aqueous alkali.

CARLETON ELLIS.